(12) United States Patent  
Nakata

(10) Patent No.: US 7,215,468 B2  
(45) Date of Patent: May 8, 2007

(54) CONFOCAL MICROSCOPE

(75) Inventor: Tatsuo Nakata, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/899,636

(22) Filed: Jul. 26, 2004

(65) Prior Publication Data

US 2005/0024719 A1 Feb. 3, 2005

(30) Foreign Application Priority Data

Jul. 29, 2003 (JP) .............. 2003-203132

(51) Int. Cl.
  G02B 21/06 (2006.01)
  G02B 6/02 (2006.01)
  G02B 6/032 (2006.01)
(52) U.S. Cl. .................. 359/386; 385/125
(58) Field of Classification Search ........ 359/385, 359/386, 389, 368; 385/125
  See application file for complete search history.

(56) References Cited

U.S. PATENT DOCUMENTS 6,888,674 B1* 5/2005 Birk et al. ............. 359/385
6,909,542 B2* 6/2005 Sasaki ................... 359/385
2002/0018290 A1* 2/2002 Birk et al. ............. 359/368

FOREIGN PATENT DOCUMENTS

| JP | 9-127424 A | 5/1997 |
| JP | 11-231222 A | 8/1999 |
| JP | 2002-048979 A | 2/2002 |
| WO | WO02/39159 | * 5/2002 |

* cited by examiner

Primary Examiner—Alessandro Amari  
(74) Attorney, Agent, or Firm—Frishauf, Holtz, Goodman & Chick, P.C.

(57) ABSTRACT

A confocal microscope comprises a light source unit having at least two light sources which generate lights having different wavelengths, an objective lens which condenses light from the light source unit on a sample, a light scanning unit which scans the light form the light source unit on the sample two-dimensionally, and a photonic crystal fiber which is disposed between the light source unit and the light scanning unit, and which propagates the light led from the light source unit to the light scanning unit side, wherein the photonic crystal fiber has a plurality of air holes arranged at a clad provided at a periphery of a core.

17 Claims, 5 Drawing Sheets

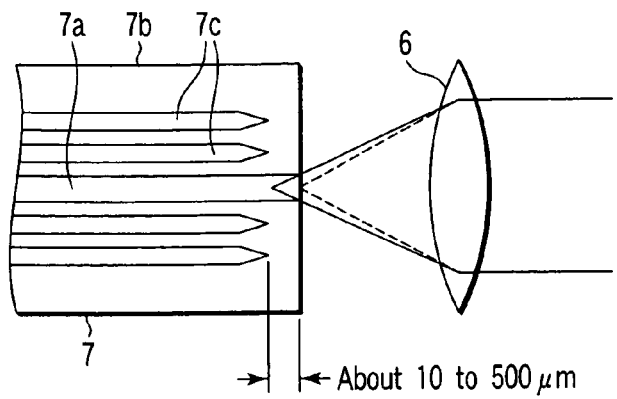
F I G. 3
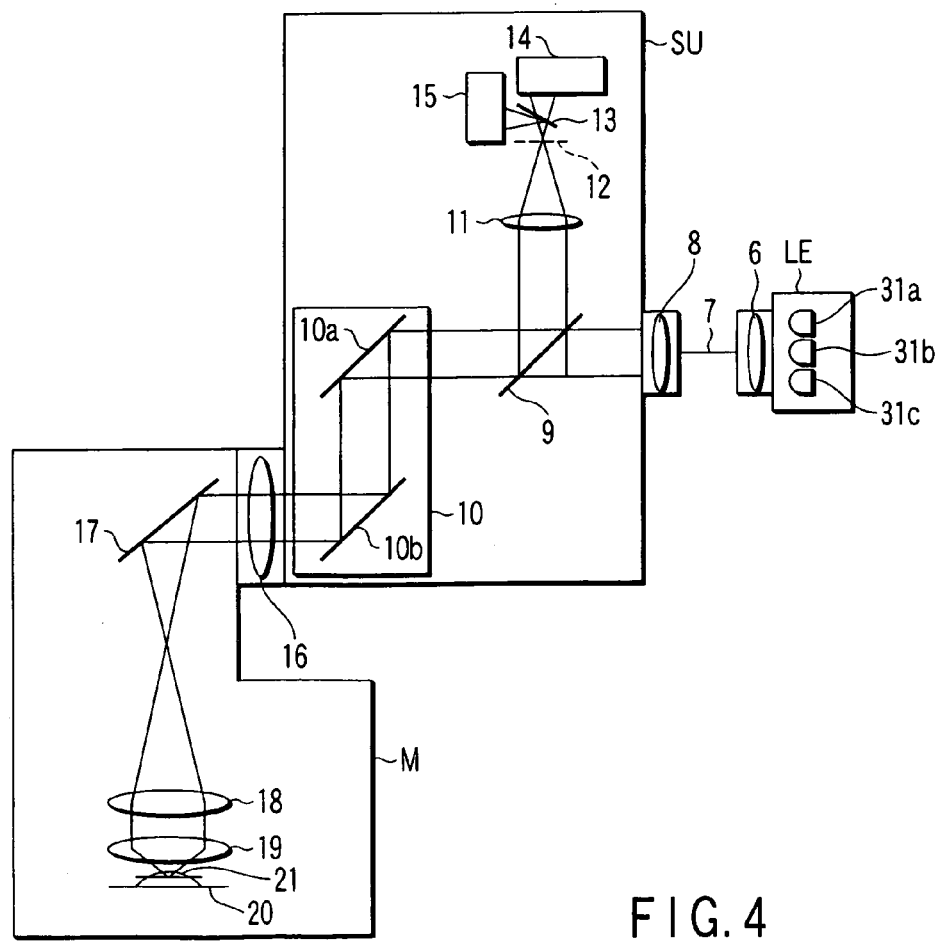
F I G. 4

CONFOCAL MICROSCOPE

CROSS-REFERENCE TO RELATED APPLICATIONS

This application is based upon and claims the benefit of priority from the prior Japanese Patent Application No. 2003-203132, filed Jul. 29, 2003, the entire contents of which are incorporated herein by reference.

BACKGROUND OF THE INVENTION

1. Field of the Invention

The present invention relates to a confocal microscope which two-dimensionally scans a light from a point light source with respect to a sample, and which detects a light from the sample.

2. Description of the Background Art

The confocal microscope condenses a light from a point light source on a sample by an objective lens, two-dimensionally scans the condensed light point optically by using a scanner, and obtains two-dimensional information by detecting the light (in particular, fluorescence) from the sample by a photo detector via the objective lens.

In such a confocal microscope, the sample which has been labeled by a fluorescent dye or a fluorescent protein is excited by an excitation wavelength corresponding to the label.

Therefore, when a laser light source is used as a point light source, it is necessary to prepare a laser light source for each excitation wavelength region. Thereafter, laser beams from a plurality of laser light sources are led into a scanning optical system, and are respectively condensed on a sample by an objective lens via a collimator lens for each excitation wavelength region.

In this case, a focal position on the sample is adjusted by each collimator lens. Further, a light deflecting element for synthesizing these laser beams by using a dichroic mirror, etc., and the like are provided at the scanning optical system in order to lead a laser beam, for each excitation wavelength region, which has been emitted from each collimator lens.

In Jpn. Pat. Appln. KOKAI Publication No. 11-231222, laser beams from a plurality of laser light sources are mixed so as to be incident upon one optical fiber, and an outgoing beam from the optical fiber is condensed on a sample by an objective lens via a collimator lens.

In this case, a single-mode fiber by which light propagation is carried out due to a light being confined in a core by utilizing a slight refractive index difference between a core and a clad is used as an optical fiber.

In Jpn. Pat. Appln. KOKAI Publication No. 9-127424, there is disclosed a method for optically propagating lights of LEDs having different luminous colors by utilizing a single-mode fiber.

BRIEF SUMMARY OF THE INVENTION

A confocal microscope according to an aspect of the present invention is characterized by comprising: a light source unit having at least two light sources which generate lights having different wavelengths; an objective lens which condenses light from the light source unit on a sample; a light scanning unit which scans the light form the light source unit on the sample two-dimensionally; and a photonic crystal fiber which is disposed between the light source unit and the light scanning unit, and which propagates the light led from the light source unit to the light scanning unit side, wherein the photonic crystal fiber has a plurality of air holes arranged at a clad provided at a periphery of a core.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a diagram for explanation of an end-face processing of the PCF used in the first embodiment.

FIG. 4 is a diagram showing a schematic configuration of a confocal microscope according to a second embodiment of the present invention.

DETAILED DESCRIPTION OF THE INVENTION

Hereinafter, embodiments of the present invention will be described with reference to the drawings.

(First Embodiment)

Figure 1:
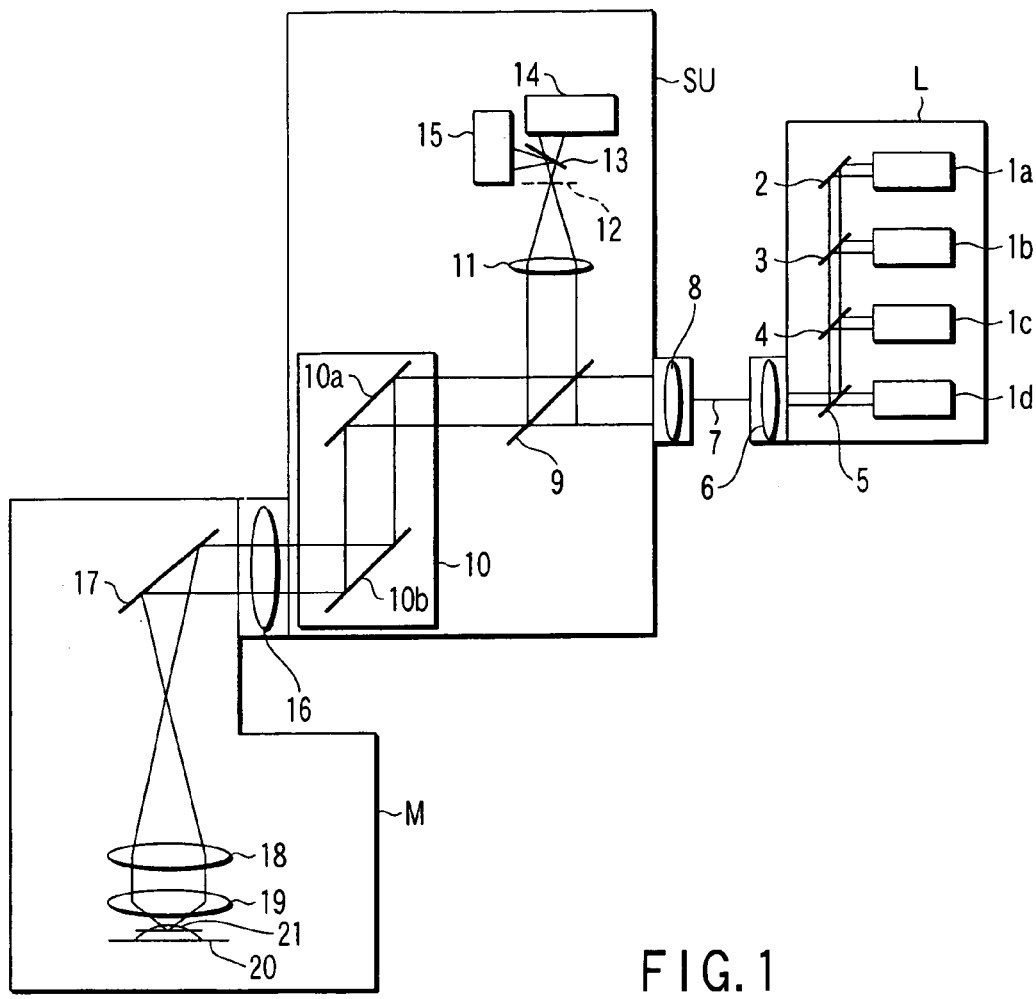
FIG. 1 is a diagram showing a schematic configuration of a confocal microscope according to a first embodiment of the present invention.

FIG. 1 is a diagram showing a schematic configuration of a confocal microscope according to a first embodiment of the present invention. The confocal microscope shown in FIG. 1 has a microscope unit M, a scanning unit SU, and a laser unit L serving as a light source unit.

The laser unit L has a laser 1a of a near-infrared wavelength or more, a visible range laser 1b, a VIOLET laser 1c, a UV laser 1d, and the like.

A reflection mirror 2 is disposed on the optical path of a laser beam from the laser 1a of a near-infrared wavelength or more. Further, on the optical path of a laser beam from the visible range laser 1b, a dichroic mirror 3 is disposed on the intersection with a laser beam reflected by the reflection mirror 2. The dichroic mirror 3 synthesizes these two optical paths of the laser beams, allows the laser beam reflected by the reflection mirror 2 to pass through, and reflects the laser beam from the visible range laser 1b.

On the optical path of a laser beam from the VIOLET laser 1c, a dichroic mirror 4 is disposed on the intersection with the light synthesized by the reflection mirror 3. The dichroic mirror 4 synthesizes these two optical paths for the laser beams, allows the laser beam synthesized by the reflection mirror 3 to pass through, and reflects a laser beam from the VIOLET laser 1c.

On the optical path of a laser beam from the UV laser 1d, a dichroic mirror 5 is disposed on the intersection with the light synthesized by the reflection mirror 4. The dichroic mirror 5 synthesizes these two optical paths for the laser beams. The dichroic mirror 5 reflects the laser beam synthesized by the reflection mirror 4, allows the laser beam from the UV laser 1d to pass through, and radiates a laser beam of multiwavelength on the same optical axis.

On the outgoing optical path of the laser beam of multi-wavelength from the dichroic mirror 5 of the laser unit L, an incident terminal of a photonic crystal fiber (hereinafter called "PCF" in short) 7 is disposed via a coupling lens 6.

The coupling lens 6 condenses the laser beam emitted from the dichroic mirror 5 onto the incident terminal of the PCF 7. The PCF 7 has a clad with a structure in which many of air holes are regularly arranged. The details of the PCF 7 will be described later. Further, the PCF 7 outputs a single-mode light of multiwavelength.

A collimator lens 8 is disposed at an outgoing terminal of the PCF 7. The collimator lens 8 converts the single-mode light of multiwavelength into a parallel luminous flux.

The parallel luminous flux from the collimator lens 8 is led into the scanning unit SU.

In the scanning unit SU, a wavelength dividing element 9 is disposed on the optical path of the parallel luminous flux from the collimator lens 8. The wavelength dividing element 9 allows an excitation wavelength needed for exciting a sample 21 which will be described later, in the light of the parallel luminous flux, to pass through, and reflects a fluorescent wavelength which has been excited on the sample 21 and has emitted fluorescence.

A galvanometer mirror unit 10 is disposed on the optical path of the laser beam (excitation wavelength light), which has passed through the wavelength dividing element 9. The galvanometer mirror unit 10 has two galvanometer mirrors 10a and 10b for deflecting light in the two directions perpendicular to each other. The laser beam (excitation wavelength light) is deflected in two-dimensional directions by these galvanometer mirrors 10a and 10b.

A confocal lens 11, a confocal pinhole 12, a dichroic mirror 13, and photoelectric conversion elements 14 and 15 which constitute confocal observing means are disposed on an optical path of the reflected fluorescent light from the sample 21 of the wavelength dividing element 9. For example, photomultipliers are used as the photoelectric conversion elements 14 and 15.

The microscope unit M is connected to the scanning unit SU via a relay lens 16.

In the microscope unit M, a mirror 17 is disposed on the optical path of the laser beam (excitation wavelength light) deflected by the galvanometer mirror unit 10. An image forming lens 18 and an objective lens 19 are disposed on the optical path of a reflected light by the mirror 17.

In this case, the laser beam (excitation wavelength light) which has been reflected by the mirror 17 via the relay lens 16 and has further passed through the image forming lens 18 passes through the objective lens 19, and is irradiated onto the sample 21 placed on a stage 20. At that time, the light passing through the objective lens 19 by the image forming lens 18 is condensed on the sample 21 at a luminous flux diameter of the above collimator lens 8, and is scanned within a predetermined range on the sample 21 by the movements of the galvanometer mirrors 10a and 10b.

The laser beam (excitation wavelength light) condensed on the sample 21 may be statically irradiated in a spot manner in accordance with a use, or may be irradiated on a plurality of arbitrary positions in a spot manner due to the scanning unit SU being momentarily operated so as to skip.

The sample 21 emits fluorescence due to a fluorescent indicator being excited by the laser beam (excitation wavelength light). This fluorescence passes through the image forming lens 18, the mirror 17, the relay lens 16, and the galvanometer mirrors 10a and 10b, from the objective lens 19 in a direction opposite to the above optical path. Then, this fluorescence reaches the wavelength dividing element 9, and is reflected by the wavelength dividing element 9 and condensed on the confocal lens 11. Then, the fluorescence only on the focal plane is selected through the pinhole 12 at the condensed light position, and the light from which the fluorescent wavelength is divided by the dichroic mirror 13 is received by the photoelectric conversion elements 14 and 15 and formed into an image.

Note that, as the laser 1a of a wavelength greater than or equal to a near-infrared wavelength, an IR pulse laser can be used. Provided that such an IR pulse laser is used, a fluorescent image can be acquired due to two-photon absorption. Because the two-photon absorption phenomenon at that time arises at only an image formation position, the pinhole 12 can be theoretically made to be fallen into disuse.

Next, the PCF (photonic crystal fiber) 7 will be described.

Figure 2:
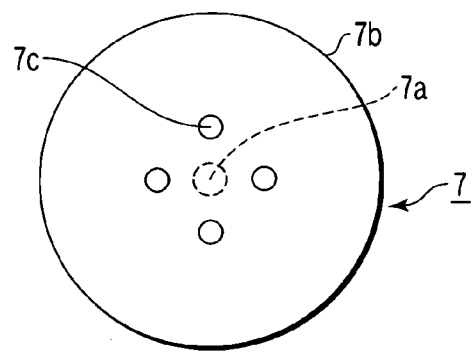
FIG. 2 is a diagram showing a schematic configuration of a PCF used in the first embodiment.

FIG. 2 is a diagram showing a sectional view of the PCF 7. For example, a clad 7b formed from Si is provided at the periphery of a core 7a formed from Ge. Further, many air holes 7c are regularly arranged at the clad 7b at the periphery of the core 7a. In this case, both of the core 7a and the clad 7b of the PCF 7 may be formed from the same material (for example, silica).

The characteristic of the PCF 7 is determined on the basis of an arrangement of the air holes 7c of the clad 7b, the number of the air holes 7c, a ratio that the air holes 7c occupy an area within the entire area of the clad 7b, a diameter of the core 7a, a material of the core 7a, and the like.

Given that grid interval $\Lambda$: a central interval of the air holes 7c;

air hole diameter d: an air hole diameter of the clad 7d;

core diameter 2a: a minimum diameter of the high refractive index portion of the central defect and a diameter circumscribing a first layer air hole;

proportional air hole diameter $d/\Lambda$: a ratio between d and $\Lambda$ (this value relates to an effective refractive index of the clad, which is frequently used as a parameter for standardizing a structure);

air filling fraction F: a ratio of air with respect to a catalyst with a high refractive index; and standardized frequency $\Lambda/\lambda$: a relative magnitude of the central interval of the air holes with respect to a wavelength (a standardized frequency is used rather than $\Lambda$ itself for describing the waveguide characteristic), the relational expression of these is expressed by Core diameter=$2\Lambda-d$     (1)

Air filling fraction $$F = \frac{\pi}{2\sqrt{3}}(d/\Lambda)^2 \qquad (2)$$

The refractive index waveguide type PCF is the same as a general fiber in that the waveguide principle is totally reflective. The characteristics of the both differ from each other in that the effective refractive index of the clad 7b greatly varies in accordance with a wavelength of a light. The effective refractive index of the clad 7b varies in accordance with the relationship between the sizes of a diameter or a pitch of the air holes 7c and a wavelength. In accordance therewith, the characteristic is generated in which the PCF operates in a single mode even if a wavelength is short, or the PCF operates in a single mode even if however large an area of the core a is made (ESM: END-LESSLY-SINGLEMODE).

The other difference is in that a refractive index difference with the core 7a can be made far greater than the case of a general optical fiber. The effective refractive index of the clad 7b can be controlled on the basis of a diameter or a pitch of the air holes 7c, and the effective refractive index is greatly decreased by increasing the effect of air due to the air holes 7c being made larger. Namely, as compared with the conventional optical fiber, a degree of freedom of a variation in a refractive index difference is very high.

The refractive index difference between the core 7a and the clad 7b relates to a light waveguide structure (light confinement structure), and the light waveguide structure correlates with the waveguide dispersion of the optical fiber. In accordance therewith, the waveguide dispersion can be made to vary over a broad range in the PCF 7. Accordingly, by combining the waveguide dispersion and the material dispersion (dispersion in a material itself of the fiber), for example, an optical fiber of a short wavelength which has zero-dispersion or an optical fiber whose dispersion is flat over a broad wavelength region can be realized.

Moreover, by providing a structural anisotropy in which an air hole diameter of the clad 7b is made to differ in XY directions, by making the core diameter be non-circular, or the like, a great polarization-preservativity is generated, and a polarization-preserving fiber can be realized.

The number of waveguide modes of a general optical fiber is determined by a value V in the following equation, and when the value V is less than or equal to 2.4, the optical fiber operates in a single mode.

$$V = \frac{2\pi a}{\lambda}\sqrt{n_{co}^2 - n_{cl}^2} \qquad (3)$$

In the general single-mode fiber, $n_{co}$ and $n_{cl}$ equivalently vary in accordance with a wavelength due to the material dispersion. Therefore, a value in square root of equation (3) is substantially constant with respect to the wavelength. As a result, value V varies so as to be inversely proportional to a wavelength $\lambda$, and when the wavelength is made shorter, V<2.4 which is the single mode condition cannot be achieved.

On the other hand, with respect to the PCF 7, this equation is expressed by the following equation.

$$Veff = \frac{2\pi\Lambda}{\lambda}\sqrt{n_0^2 - n_{eff}^2} \qquad (4)$$

$\Lambda$: grid interval,
$\sqrt{n_0}$: refractive index of silica, and
$n_{eff}$: effective refractive index of clad.

In this equation (4), because a value of $n_{eff}$ in square root has a wavelength dependency, the value Veff shows a wavelength dependency different from that of the general optical fiber. In accordance therewith, a difference between the effective refractive indexes of the core and the clad is made small when a wavelength is made shorter, both of the values of $\lambda$ and the value of square root in equation (4) are made smaller, and the both offset each other. Namely, the PCF 7 is not inversely proportional to $\lambda$ as the general optical fiber, but a variation in accordance with a wavelength is made smaller. The variation becomes slower as the wavelength becomes shorter, and the value Veff approximates to a fixed value (maximum value). When proportional air hole diameter d/$\Lambda$: a ratio between d and $\Lambda$ is small, the maximum value of value Veff is converged into an even smaller value. In the case of PCF, it is shown that the PCF operates in a single mode when the value Veff is less than or equal to 4.1, and a value d/$\Lambda$ satisfying this condition is less than or equal to about 0.4.

Further, an NA is provided by the following equation.

$$NA = n_{co}\sqrt{2\Delta n}$$

$$\Delta n = n_{c0} - n_{eff} \qquad (5)$$

In the general optical fiber, because a refractive index difference $\Delta n$ between the core and the clad hardly varies in accordance with a wavelength, the NA as well hardly varies due to a wavelength. In contract thereto, in the PCF 7, because the shorter the wavelength is, the more the $n_{eff}$ approximates to $n_{c0}$, the PCF 7 shows conspicuous wavelength dependency, and the shorter the wavelength is, the smaller the NA becomes.

Therefore, although it is necessary to make a core diameter be small in order for the general optical fiber to be in a single mode with a short wavelength, the PCF can be made to be in a single mode with a short wavelength even if a core diameter is not made small. Further, in the general optical fiber, there is no variation in NA due to a wavelength as is. However, in the PCF 7, as is clear from equation (5), the NA can be made smaller as the wavelength becomes shorter.

By using such a PCF 7, as the confocal microscope, for example, even if there is a case in which the VIOLET laser 1b of around 405 nm and the visible range laser of 440 to 635 nm are simultaneously used, light propagation to the scanning unit SU side can be carried out by only one PCF 7. Of course, even if it is a laser from an ultraviolet region of about 350 nm to a near-infrared wavelength of 1200 nm or more, only one PCF 7 can correspond thereto. Thus, the conventional single mode fiber can propagate only the visible range laser of 440 to 635 nm.

Accordingly, in this way, by using the PCF 7 as a fiber connecting between the laser unit L and the scanning unit SU, a light of a broad wavelength region from a near-infrared wavelength region to a UV wavelength region can be optically propagated to the scanning unit SU side by only one PCF 7. Namely, conventionally, when a wavelength region is enlarged, it is necessary to divide a fiber for each predetermined wavelength region, and optically propagate the light to the scanning unit. However, the light propagation can be carried out by only one PCF 7 at a minimum.

In accordance therewith, because there is no need to prepare the laser unit L for each wavelength region, and the laser units L can be unified, not only the structure of the control system for controlling laser beam can be made simple, but also the number of wirings can be reduced. On a price basis, it can be made at a low price, and because the number of wirings can be reduced, an attempt can be made to improve the reliability.

Further, because light can be optically propagated to the scanning unit SU side by only one PCF 7, even after the light has been led to the scanning unit, there is no need to prepare an optical system such as a collimator lens or the like for each predetermined wavelength region, and an adjustment of optical axis for each wavelength region is not required. Conventionally, because an adjustment of optical axis of the optical system for each wavelength region is physically carried out, a shift in optical axis has been easily arisen due to thermal expansion or the like. However, because an adjustment of optical axis can be omitted due to light being coaxially led by only one PCF 7, there is no shift in the optical axis, and because there is no case in which a scanning position on a sample changes due to a shift in optical axis, an image to be acquired is highly reliable.

Moreover, in a case in which a laser of another wavelength region is newly added after the microscope has been delivered, an optical adjustment may be carried out by the laser unit L, and because the PCF 7 can correspond thereto as is, it is easy to set-up it at user's home. Further, when the fiber is broken down due to some effect, conventionally, in addition to a coupling adjustment of the fiber and an optical adjustment for leading light to the scanning unit, an optical adjustment in the scanning unit is further required. However, in the case of the PCF 7, because only a coupling adjustment for the PCF 7 and an optical adjustment for leading light to the scanning unit are sufficient after replacing the fiber, the maintenance performance is high.

Furthermore, conventionally, because a laser beam emitted from a collimator lens for each wavelength region is led into an objective lens in the scanning unit, these laser beams are synthesized by a light deflecting element using a dichroic mirror or the like. However, because these light deflecting elements are not required, the scanning unit can be made compact, and a loss of light through the light deflecting elements can be prevented, so that an efficient light propagation can be carried out.

FIG. 3 is a diagram for explanation of an end-face processing of the PCF 7. In FIG. 3, in the PCF 7, the clad 7*b* formed from silica is provided at the periphery of the core 7*a* formed from Ge, and further, the many air holes 7*c* are arranged at the clad 7*b* at the periphery of the core 7*a*. In this case, connectors (not shown) are attached to the both ends of the PCF 7 in order to optically connect to the coupling lens 6 or the collimator lens 8. At the time of attaching the connectors, it is necessary to grind the both ends of the PCF 7. However, microholes (the air holes 7*c*) are opened at the PCF 7 in order to provide a refractive index difference, and if the clad 7*b* end face is ground for the end-face processing, the air holes 7*c* are filled up, which deteriorates the original performance thereof. Then, a portion of the air holes 7*c* within a range of about 10 to 500 μm is omitted in advance at the end face of the clad 7*b*, and this portion of the end face can be ground. In this case, it is recommended that the laser beam which is made to be incident via the coupling lens 6 be made to be in focus on the portion where there are no air holes 7*c* from the tip of the core 7*a* to the tip of the air hole 7*c*. However, it is preferable that the laser beam which is made to be incident via the coupling lens 6 is made to be in focus on a position corresponding to the tip of the air hole 7*c* on the core 7*a*.

In the first embodiment, the example in which the laser 1*a* of a near-infrared wavelength or more, the visible range laser 1*b*, the VIOLET laser 1*c*, the UV laser 1*d*, and the like are provided as the laser unit L has been described. However, provided that there are two or more lasers, an effect which is the same as described above can be obtained.

(Second Embodiment)

Next, a second embodiment of the present invention will be described.

FIG. 4 is a diagram showing a schematic configuration of the second embodiment of the present invention, and portions which are the same as those of FIG. 1 are denoted by the same reference numerals.

In FIG. 4, a confocal microscope has an LED light source unit LE serving as a light source unit in addition to the microscope unit M and the scanning unit SU.

A blue LED 31*a*, a green LED 31*b*, and a red LED 31*c* whose luminous colors are different from one another are provided as light emitting diodes at the LED light source unit LE.

Lights emitted from the LEDs 31*a*, 31*b*, and 31*c* are synthesized by synthesizing means (not shown), and the synthesized light is condensed as a light of multiwavelength onto the incident terminal of the PCF 7 via the coupling lens 6. The PCF 7 outputs a light of a single-mode light of multiwavelength.

Hereinafter, in the same way as described in the first embodiment, the light is made to be parallel luminous flux through the collimator lens 8, and in the light of the parallel luminous flux, an excitation wavelength needed for exciting the sample 21 passes through the wave dividing element 9.

The light made to be the light of an excitation wavelength in the wave dividing element 9 is deflected in the XY directions on the surface of the sample 21 by the galvanometer mirror unit 10, and passes through the relay lens 16 and is incident upon the mirror 17. The light reflected by the mirror 17 passes through the objective lens 19 by the image forming lens 18, is condensed on the sample 21, and is scanned within a predetermined range on the sample 21 by the movements of the galvanometer mirrors 10*a* and 10*b*.

In the same way as the first embodiment, the laser beam (excitation wavelength light) condensed on the sample 21 may be statically irradiated in a spot manner in accordance with a use, or may be irradiated on a plurality of arbitrary positions in a spot manner due to the scanning unit SU being momentarily operated so as to skip.

Fluorescence is emitted by exciting a fluorescent indicator by the laser beam (excitation wavelength light) irradiated on the sample 21. This fluorescence passes through the image forming lens 18, the mirror 17, the relay lens 16, and the galvanometer mirrors 10*a* and 10*b* from the objective lens 19 in a direction opposite to the above optical path. This fluorescence is reflected by the wavelength dividing element 9, and is condensed by the confocal lens 11. Then, the fluorescence only on the focal plane is selected by the pinhole 12 at the condensed light position, and the light from which the fluorescent wavelength is divided by the dichroic mirror 13 is received by the photoelectric conversion elements 14 and 15 and formed into an image.

In accordance therewith, because the LED light source unit LE having the LEDs 31a, 31b, and 31c whose luminous colors are different from one another is used as a light source unit, and is connected to the scanning unit SU by the PCF 7, a scanning confocal microscope of a point scan system with a laser being not used can be realized.

LED light from the LED light source unit LE is led into the PCF 7. However, in the PCF 7, because the core diameter thereof can be made larger than that of the conventional single-mode fiber (for example about several tens µm), the coupling efficiency can be improved, and a single-mode light required in the confocal microscope can be exactly obtained.

Because the confocal microscope can be configured of the LEDs 31a, 31b, and 31c of the LED light source unit LE being used as a light source, it can be made at a low price on a price basis. Further, the electric power consumption of the LEDs 31a, 31b, and 31c are smaller than that of lasers, and therefore, it is possible to achieve energy conservation. Moreover, because the LEDs 31a, 31b, and 31c are very small, a compact light source can be realized. Therefore, although the LED light source unit LE is configured separately from the scanning unit SU, the LED light source unit LE can be built into the scanning unit SU, and it is possible to realize making the confocal microscope be more compact due to the integration.

The LEDs 31a, 31b, and 31c of the LED light source unit LE can be turned on and turned off by only turning the voltage on/off, and in order to vary a brightness, it is possible to vary the brightness due to a modulation by making an electric current to be variable or by turning an electric current on/off in a pulse form, so that light controlling can be easily carried out. This has conventionally required a special mechanism in order to control light. However, in the present invention, because this can be realized by only an electric control circuit, the confocal microscope is made compact, and can be made at a low price.

There is the effect in the LEDs 31a, 31b, and 31c that the life is longer than a laser, and the maintenance cost of the system is low-priced.

LEDs of various wavelengths have been fit for practical use as compared with lasers, and there is the merit that a degree of freedom for wavelength selection is higher than the excitation wavelength of the sample 21.

The wavelength width of an LED is broader than that of a laser. Therefore, the LED is used by converting into a required wavelength width by being combined with a wavelength selectable element such as a BA filter, an AOTF, and the like, whereby the selectivity of wavelength can be improved.

On the other hand, in FIG. 4, only the LEDs 31a, 31b, and 31c are provided at the LED light source unit LE. However, due to a laser light source being combined therewith, the convenience thereof can be improved in which the laser is used when an intense light is required, and the LED is used when a weak light is enough.

(Third Embodiment)

Next, a third embodiment of the present invention will be described.

When the conventional fiber is used, compensating of wavelengths of a coupling lens and a collimator lens are not carried out. The reason for this is that an NA hardly has wavelength dependency.

Figure 5:
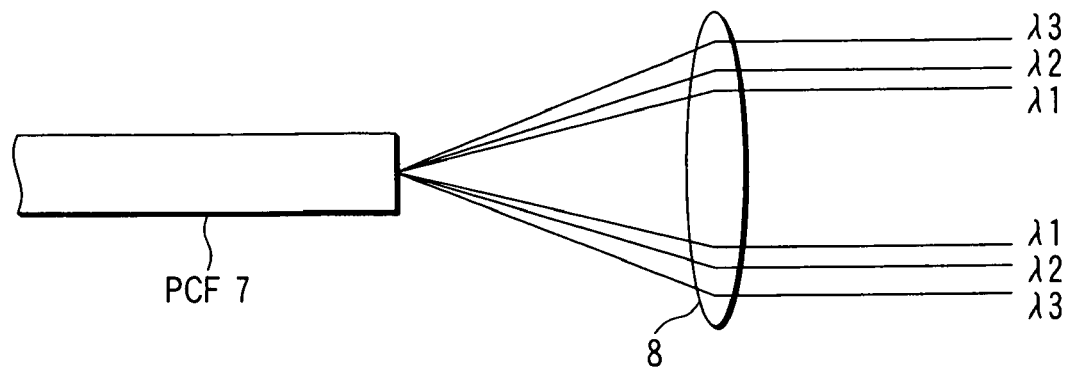
FIG. 5 is a diagram for explanation of a characteristic of a collimator lens used for a third embodiment of the present invention.

However, in the PCF 7 used in the first embodiment, the NA has wavelength dependency. Therefore, the coupling lens 6 and the collimator lens 8 are required to be designed in consideration of wavelength dependency. Namely, these coupling lens 6 and collimator lens 8 must to be configured such that a coupling function and collimate function do not depend on wavelength with respect to the core 7a of the PCF 7. Therefore, it is necessary to configure the lenses for compensating the characteristic such that the NA becomes small with respect to a short wavelength region and the NA becomes large with respect to a long wavelength region. By the way, as shown in FIG. 5, with respect to the collimator lens 8, when the NA of the PCF 7 is substantially constant, broadening of a light differs in accordance with different wavelengths $\lambda 1$, $\lambda 2$, and $\lambda 3$. The wavelengths here are $\lambda 1 < \lambda 2 < \lambda 3$.

Then, in the third embodiment, lenses in which the NAs thereof vary in accordance with a wavelength (e.g. lenses having predetermined chromatic aberration) are used as the coupling lens 6 and the collimator lens 8. In accordance therewith, the coupling efficiency by the coupling lens 6 and the parallelism of a collimator light by the collimator lens 8 can be optimized. Namely, with respect to the coupling lens 6, because the coupling efficiency can be improved, a loss of the light incident upon the PCF 7 can be reduced, and there is no need to use a light source whose light intensity is high, and an attempt can be made to achieve energy conservation. Further, with respect to the collimator lens as well, because the diameter of a luminous flux can be made substantially constant while maintaining the parallelism of the light, a loss of the light incident upon the objective lens 19 can be made to be a minimum, the light can be led into the sample 21, and the excitation efficiency can be improved.

(Modification of Third Embodiment)

A beam spot diameter formed by the objective lens 19 depends on the wavelength $\lambda$ of light and numerical aperture NA. Then, The wavelength characteristic of the optical system including the collimator lens 8 after the PCF 7 is compensated to counterbalance the change of the spot diameter by the wavelength $\lambda$ of light by adjusting numerical aperture NA (i.e., incident beam diameter to the objective lens). Thereby, the spot diameters of light from the objective lens 19 can be made uniform irrespective of the wavelength $\lambda$. Therefore, an effect due to wavelength for resolving power can be eliminated.

(Fourth Embodiment)

Next, a fourth embodiment of the present invention will be described.

By the way, the regular air holes are opened at the PCF 7. However, in this way, there are cases in which light propagation having a polarization characteristic required in the confocal microscope cannot be obtained.

Figure 6A:
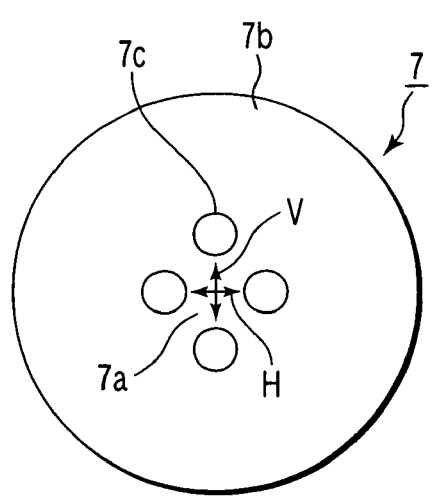
FIGS. 6A and 6B are diagrams showing schematic configurations of a PCF used for a fourth embodiment of the present invention.
Figure 6B:
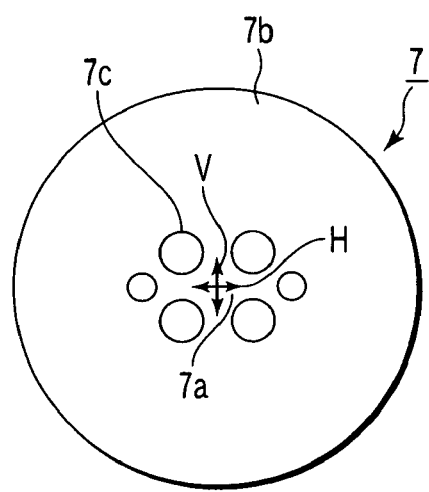

Accordingly, as the PCF 7 of the fourth embodiment, a PCF in which the arrangement of the air holes 7c formed at the clad 7b at the periphery of the core 7a is made to be different in a vertical V direction and a horizontal H direction as shown in FIGS. 6A and 6B is used.

In accordance with such a PCF 7, a light of wavelength having the polarization characteristic can be propagated in a single mode while maintaining the polarization characteristic.

Figure 7A:
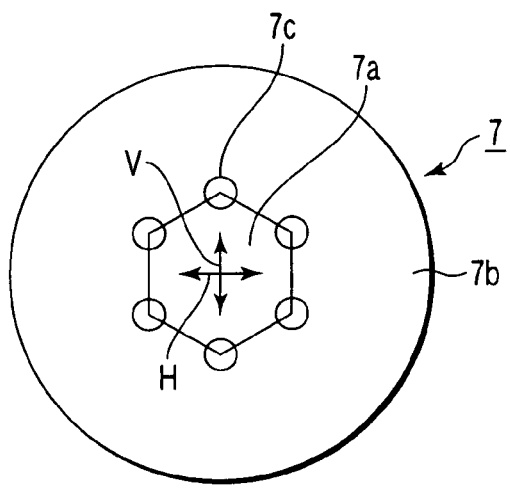
FIGS. 7A to 7C are diagrams showing schematic configurations of modified examples of the fourth embodiment.
Figure 7B:
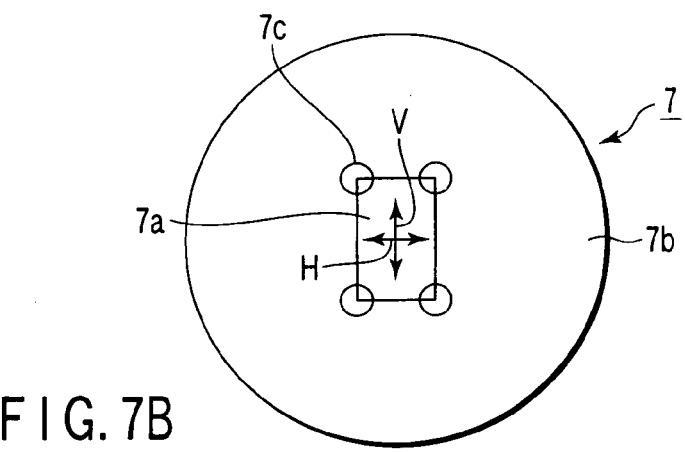
Figure 7C:
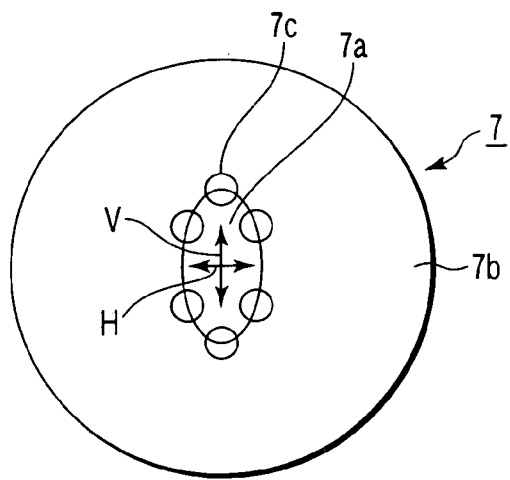

Note that, as the arrangements of the air holes 7 in the vertical V direction and the horizontal H direction, various arrangements such as, for example, a hexagonal form as shown in FIG. 7A, a rectangular form as shown in FIG. 7B, an elliptical form as shown in FIG. 7C, and the like can be thought.

Accordingly, in accordance therewith, because the light propagation of a wavelength with the polarization characteristic being maintained can be carried out by the PCF 7, a DIC observation can be easily carried out in the confocal microscope. If the polarization characteristic cannot be maintained in the PCF 7, a wavelength plate or the like is separately required. However, due to the light propagation maintaining the polarization characteristic being made possible by the PCF 7, a wavelength plate is fallen into disuse. Because this can eliminate a loss of light at the wavelength plate, it is possible to structure a system which is brighter and more efficient.

(Fifth Embodiment)

Figure 8:
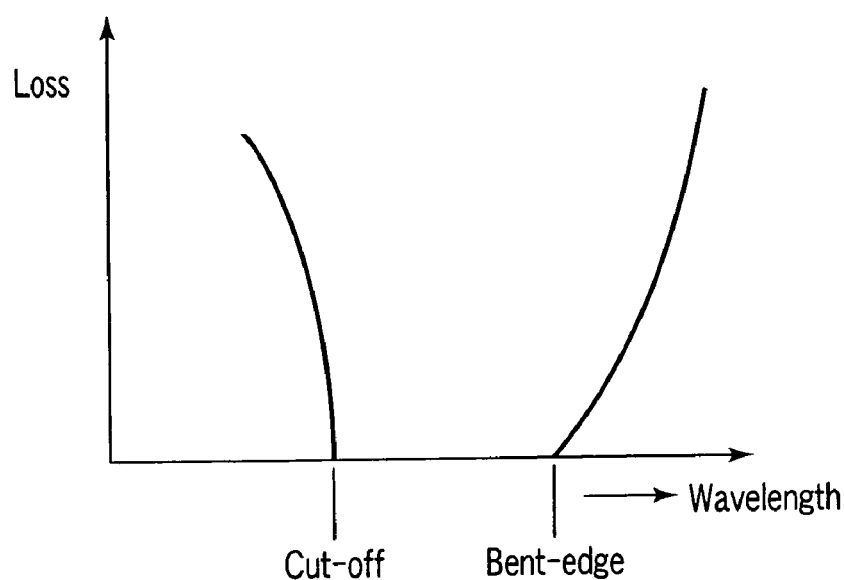
FIG. 8 is a diagram showing a wavelength characteristic of the PCF.

As shown in FIG. 8, the short wavelength side and the long wavelength side of the wavelength band of the PCF are respectively limited by a cut-off wavelength and a bent edge (bending loss due to a bending stress).

Because the PCF generally used is for communications, an available band is infrared and far-infrared regions, and cut-off wavelength is about 700 nm. However, the laser microscope can be used even in a visible region and an infrared region.

Figure 9:
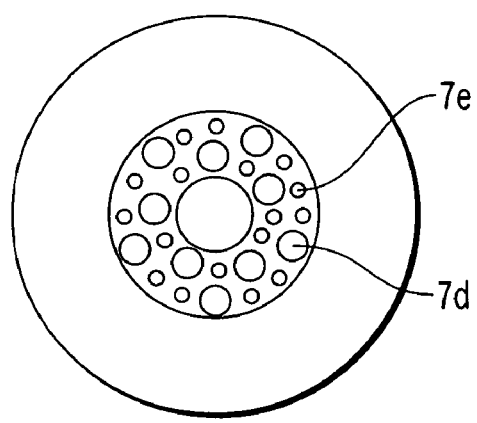
FIG. 9 is a diagram showing a schematic configuration of a PCF used for a fifth embodiment of the present invention.

Therefore, by providing air holes 7d and 7e having different diameters as shown in FIG. 9, effects due to the bending stress and the cut-off are controlled, and a propagation in a single mode at the visible region can be made to be possible.

Not that the present invention is not limited to the above-described embodiments, and various modifications are possible within a range which does not deviate from the gist of the present invention at the practical phase.

Moreover, inventions at various phases are included in the above-described embodiments, various inventions can be extracted due to a plurality of disclosed components which have been disclosed being appropriately combined. For example, provided that several disclosed components are eliminated from all of the disclosed components shown in the embodiments, when the object can be achieved, and the advantage according to the present invention can be obtained, the configuration in which the disclosed components are eliminated can be extracted as an invention.

Note that, the following inventions are included in the embodiments described above.

(1) With respect to the aforementioned photonic crystal fiber, a coupling lens and a collimator lens are respectively disposed at the incident terminal side and the outgoing terminal side.

(2) With respect to the aforementioned photonic crystal fiber, at least one photonic crystal fiber is to two light sources.

In accordance with the embodiment of the present invention, light of a broad wavelength region from a near-infrared wavelength region to a UV wavelength region can be optically transmitted in a single mode to the light scanning means side by only one PCF. Therefore, even after the light is led into the light scanning means side, there is no need to prepare an optical system for each light wavelength region, and an adjustment of optical axis for each light wavelength region is not required. In accordance therewith, there is no shift in the optical axis, and there is no case in which a scanning position on a sample is varied due to a shift in the optical axis. Moreover, in a case where a laser of another wavelength region is newly added after a microscope has been delivered, it is good that an optical adjustment is carried out by a light source unit. With respect to a PCF, the PCF itself is not required to be replaced or extended, and because the PCF can correspond thereto as is, it is easy to set-up it at user's home. In the above embodiment, light of a wavelength region from a near-infrared wavelength region to a UV wavelength region is optically transmitted in a single mode to the light scanning means side by only one PCF, in addition, light of a wavelength region from an infrared wavelength region to a UV wavelength region may be transmitted.

Further, in accordance with the embodiment of the present invention, due to a PCF whose core diameter is made broad (for example, about several tens μm) being used, a relatively large point light source such as a light emitting diode can be used. Further, by using light emitting diodes whose luminous colors are different from each other as a light source unit, a point scan system confocal microscope can be realized.

Moreover, in accordance with the embodiment of the present invention, the spot diameters of lights from the objective lens can be made uniform, and the effect due to wavelength resolving power can be eliminated.

Furthermore, in accordance with the embodiment of the present invention, it is possible to propagate a light of a wavelength with the polarization characteristic being maintained, by the PCF.

As described above, in accordance with the embodiments of the present invention, a confocal microscope in which due to a fiber by which it is possible to propagate a light of a broad wavelength region being used, an optical system for each wavelength region and an optical adjustment for each optical system can be fallen into disuse can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A confocal microscope comprising:
   a light source unit including at least two light sources which generate lights having different wavelengths;
   an objective lens which condenses light from the light source unit on a sample;
   a light scanning unit which two-dimensionally scans the light from the light source unit on the sample; and
   a photonic crystal fiber which is disposed between the light source unit and the light scanning unit, and which propagates the light from the light source unit to the light scanning unit side,
   wherein the photonic crystal fiber comprises a core and a clad provided at a periphery of the core, and a plurality of air holes provided in the clad; and
   wherein an arrangement of the air holes differs in a vertical direction and in a horizontal direction in the photonic crystal fiber to propagate the light from the light source unit while maintaining a polarization characteristic of the light.

2. The confocal microscope according to claim 1, wherein said plurality of air holes include air holes having a first diameter and air holes having a second diameter different from the first diameter.

3. The confocal microscope according to claim 2, wherein a wavelength characteristic of an optical system to which light is led from the photonic crystal fiber is optically compensated with respect to a wavelength characteristic of an NA at the photonic crystal fiber.

4. The confocal microscope according to claim 2, wherein a wavelength characteristic of an optical system to which light is led from the photonic crystal fiber side is optically compensated such that a spot diameter formed by the objective lens is constant.

5. The confocal microscope according to claim 1, wherein at least one of the at least two light sources of the light source unit comprises a light emitting diode.

6. The confocal microscope according to claim 1, wherein the at least two light sources of the light source unit comprise light emitting diodes.

7. The confocal microscope according to claim 1, wherein a wavelength characteristic of an optical system to which light is led from the photonic crystal fiber is optically compensated with respect to a wavelength characteristic of an NA at the photonic crystal fiber.

8. The confocal microscope according to claim 1, further comprising a collimator lens which collimates an outgoing beam from the photonic crystal fiber, and
wherein a wavelength dependency of NA of the photonic crystal fiber is compensated by varying NA of the collimator lens.

9. The confocal microscope according to claim 1, wherein said plurality of air holes are not formed within a region at a predetermined distance from an end face of the photonic crystal fiber.

10. The confocal microscope according to claim 9, wherein the predetermined distance is from 50 to 500 μm.

11. The confocal microscope according to claim 9, wherein said plurality of air holes include air holes having a first diameter and air holes having a second diameter different from the first diameter.

12. The confocal microscope according to claim 11, wherein a wavelength characteristic of an optical system to which light is led from the photonic crystal fiber is optically compensated with respect to a wavelength characteristic of an NA at the photonic crystal fiber.

13. The confocal microscope according to claim 9, wherein a wavelength characteristic of an optical system to which light is led from the photonic crystal fiber is optically compensated with respect to a wavelength characteristic of an NA at the photonic crystal fiber.

14. The confocal microscope according to claim 9, wherein a wavelength characteristic of an optical system to which light is led from the photonic crystal fiber is optically compensated such that a spot diameter formed by the objective lens is constant.

15. The confocal microscope according to claim 9, further comprising a collimator lens which collimates an outgoing beam from the photonic crystal fiber, and
wherein a wavelength dependency of NA of the photonic crystal fiber is compensated by varying NA of the collimator lens.

16. The confocal microscope according to claim 1, wherein the light source unit emits light of visible range and at least one of violet, ultra-violet, near-infrared, and infrared ranges; and
wherein the photonic crystal fiber transmits light emitted from the light source unit to the light scanning unit via only one photonic crystal fiber.

17. The confocal microscope according to claim 1, wherein the confocal microscope carries out a DIC observation using the light propagated by the photonic crystal fiber while the polarization characteristic of the light is maintained.

* * * * *